United States Patent Office 3,236,261
Patented Feb. 22, 1966

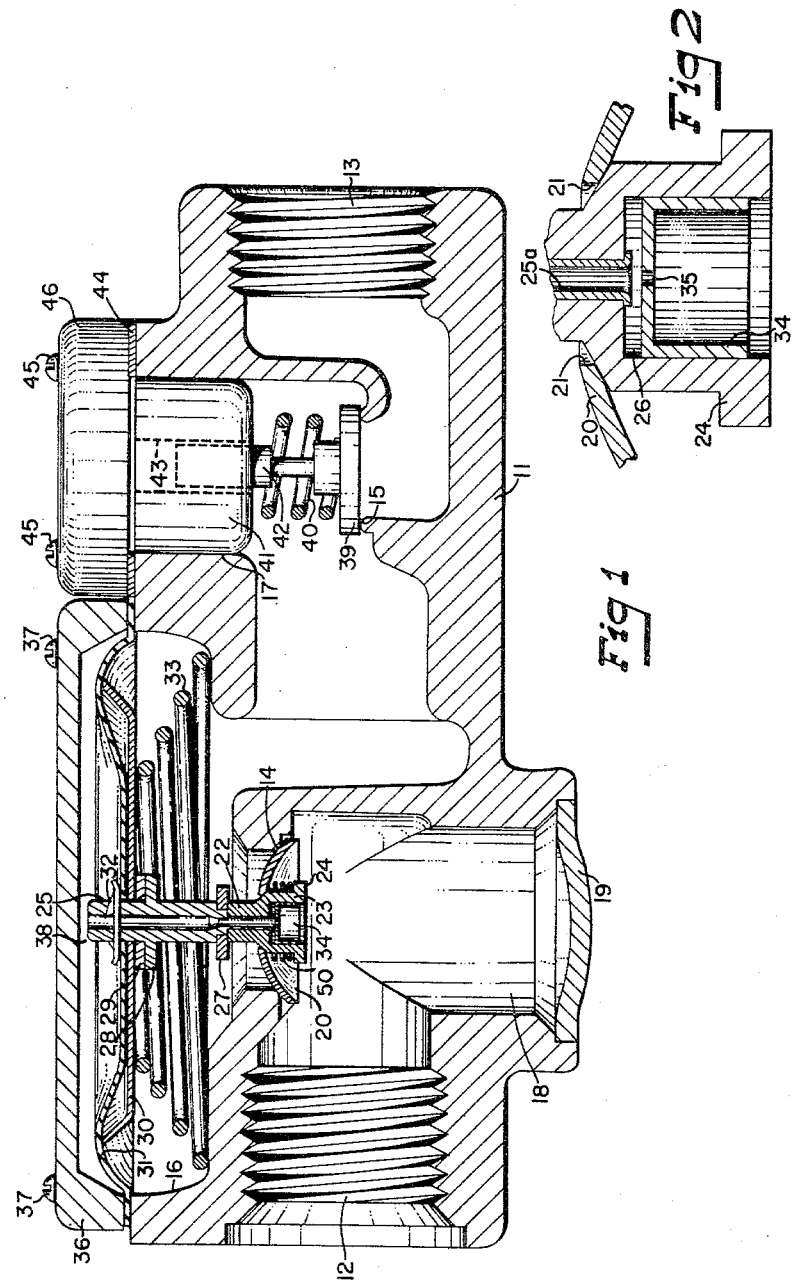

3,236,261
PRESSURE OPERATED STEP-OPENING VALVE
Hugh M. Morgan, Culver City, Calif., assignor to Honeywell Inc., Minneapolis, Minn., a corporation of Delaware
Filed Aug. 14, 1961, Ser. No. 131,126
3 Claims. (Cl. 137—628)

This invention relates to a differential pressure step-opening valve and, more particularly, to a pressure operated valve in combination with an on-off control valve to provide a step opening gas valve which maintains a uniform pressure differential between the supply pressure and the outlet pressure to a burner, over a wide range of supply pressures, even down to less than 1 inch water column.

One of the objects of the invention is to provide in a unitary manifold valve, a step opening valve which maintains a uniform pressure differential across the valve over a wide range of supply pressures so as to assure step opening at lower than normal supply pressures.

Another object of the invention is to provide a manifold valve of simple construction which will provide for step opening thereof when the valve is applied to a fuel supply line of a burner.

Another object of the invention is to provide a pressure operated valve in combination with an on-off control valve wherein the pressure operated valve consists of a pair of valves, one of which is a low rate valve which opens to provide a minimum flow for ignition purposes, and the second of which is a valve that opens to provide regular gas flow.

Still further objects of the invention will become apparent upon reading the following detailed description of the invention in conjunction with the accompanying drawing wherein:

FIGURE 1 is a cross sectional view of the invention on a scale twice the actual size of the valve; and FIGURE 2 is an enlarged, fragmentary and cross sectional view of an orifice member positioned in the smaller of two pressure operated valves in the step-opening valve.

Referring to FIGURE 1 of the drawing, the step opening valve consists of a body casting 11 having a threaded inlet 12, a threaded outlet 13 and two valve seats 14 and 15 therebetween. The valve body has a large recess 16 in the top thereof over the valve seat 14 and has a bore 17 through the top wall thereof over the valve seat 15. There is also a bore 18 through the bottom wall of the valve body coaxial with the valve seat 14. This bore 18 is closed at its outer end by means of a Welch plug 19.

Cooperating with the valve seat 14 is a disc type of valve 20 having an opening 21 therein through which extends a sleeve type of valve 22 having an enlarged head portion 23 that is arranged to close the opening 21 in the disc valve 20. The valve 22 has a flange 24 thereon at the lower end of the head portion 23 and is connected to a tubular stem 25 by having a reduced diameter portion of the stem 25 extend through the valve 22 and riveted over at the upper end of a bore 26 in the head 23. A washer 27 fits in an annular groove in the lower end of the stem 25 and is clamped against the upper end of the valve 22, to serve as an angular abutment shoulder on the stem. The stem 25 has an annular shoulder 28 thereon intermediate its ends, with a sealing washer 29 thereon to sealingly engage a backing plate 30 for a diaphragm 31. The diaphragm is clamped against the plate 30 and the sealing washer by means of a Tinnerman nut 32.

A helical spring 33 normally biases the diaphragm upwardly so as to hold the valve 22 against the valve 20 and valve 20 against the valve seat 14. A coil compression spring 50, positioned between the flange 24 and underside of the valve 20, normally biases the valve 22 away from the valve 20 and holds the valve 20 against the valve seat 14 until the valve 23 separates from the valve 20 sufficiently far to enable the abutment washer 27 to engage the valve 20, whereupon lowering of the valve stem 25 an additional amount will cause opening of the valve 20.

To regulate the speed of operation of the valves 22 and 20, a cup shaped orifice member 34, having an orifice 35 therein, is positioned in the bore 26.

The periphery of the diaphragm 31 is clamped to the top of the valve body by means of an inverted dish-shaped cover member 36 that is secured to the body portion by means of bolts 37. The space between the diaphragm and the inner surface of the cover member 36 provides a pressure chamber 38 that is in constant communication with the inlet 12 through the orifice 35, the center of the valve 22, and the center of the stem 25 that extends into the chamber 38.

Disc valve 39 is normally biased against the valve seat 15 by means of a coil compression spring 40 that is positioned between the valve 39 and the housing 41 of a solenoid actuator for the valve 39. The valve 39 is connected to a plunger 42 of the solenoid which is adapted to move into a tube 43 of the solenoid. The solenoid housing is secured to the valve body, with a sealing washer 44 therebetween, by means of bolts 45 extending through a cover 46 secured by any suitable means (not shown) to the solenoid housing 41.

Operation

The step opening valve is illustrated as being in its shut down condition. That is, the solenoid 41 is de-energized, causing the spring 40 to hold the valve 39 closed, and the valves 22 and 20 therebetween are closed as a result of the pressure in the chamber 38 being equal to the pressure in the chamber between the valves 20 and 39, so that the spring 33 overcomes the weight of the backing plate 30, valve stem 25, the valves 20 and 22 and their associated parts, and the force of the compression spring 50.

Assuming that the solenoid is electrically connected through a thermostat to a power source and the inlet 12 is connected to a fuel supply and the outlet 13 is connected to a burner of a heating installation, fuel can be supplied to the heating installation by the closing of the thermostat, causing energization of the solenoid 41. When the valve 39 is opened by said energization, pressure below the diaphragm 31 is relieved so that the pressure in the chamber 38 can force the valve stem 25 downwardly a sufficient distance to open or separate the valve head 23 from the valve 20 to permit a minimum flow of gas to flow between the two valves for ignition purposes. The valve stem will be moved downwardly short of the distance between abutment washer 27 and valve 20, due to the limited expansion of gas in the chamber 38 so that any further downward movement of the stem 25 is dependent upon the rate at which fuel from the inlet can pass through the orifice 35 to cause further downward movement of the stem 29 to pick up the valve 20 and move it to a position which will provide a balance between the inlet and the outlet of the valve, as determined by the spring rate of the spring 33. Obviously by varying the spring rate of the spring 33, the pressure differential maintained between the inlet and the outlet of the valve may be varied. It is also obvious that the speed of operation or the time on the step, in the step opening operation, is a function of the pressure drop across the orifice 35. By varying the spring rate and/or varying the size of the orifice 35, various rates in the pressure differential and opening times may be obtained and a uniform pressure differential between the inlet and outlet may be maintained over a wide range of supply pressures and rates of fuel flow. It might also be noted at this point that the cup shaped orifice member 34 could be replaced by an orifice member positioned at the upper end of the stem 25 and still have the valve function in the same manner.

Upon the solenoid 41 becoming de-energized, as when the thermostat circuit is opened, pressure will rapidly build up under the diaphragm 31 to cause the valves 20 and 22 to close.

As it is obvious that a control valve other than a solenoid valve may be used to operate the valve 39 and that other modifications may be made in the means for operating the valves 22 and 20, without departing from the spirit of the invention, it is to be understood that the scope of the invention is to be determined from the appended claims.

I claim as my invention:

1. A step-opening fuel valve comprising: a valve body having an inlet adapted to be connected to a source of fuel under pressure and an outlet adapted to be connected to a fuel burner; an on-off valve in said body near said outlet; a modulating valve in said body near said inlet; said modulating valve including a main closure member having an opening therethrough, a small closure member adapted to close said opening, and means intermediate said closure members yieldably biasing said small closure member away from said main closure member; a first chamber in said body between said valves; a second chamber in said body; a pressure responsive movable wall having one side thereof exposed only to fuel pressure in said first chamber and the other side thereof exposed only to fuel pressure in said second chamber; means, including a direct connection between said small closure member and said movable wall, operably connecting said modulating valve to said movable wall so that fuel pressure in said first chamber tends to close said modulating valve and so that fuel pressure in said second chamber tends to open said modulating valve; a fluid passage connecting said second chamber to said inlet; a restriction in said passage; and biasing means operably connected to said movable wall and urging said movable wall towards said second chamber and thereby tending to close said modulating valve, said biasing means having force characteristics such that when said on-off valve is closed said biasing means and the fuel pressure in said first chamber effect closure of said modulating valve and upon initial opening of said on-off valve, and the consequent relief of pressure of said first chamber, said biasing means yields to expansion of fuel in said second chamber to effect movement of said modulating valve to a partially open position and thereafter yields to the gradual build up of fuel pressure in said second chamber through the restriction in said passage and effects opening of said modulating valve to a full flow position.

2. A step-opening fuel valve as defined in claim 1 wherein a lost-motion connection is provided between said small closure member and said main closure member so that initial movement of said movable wall moves said small closure member a substantial distance to define said partially open position while said main valve remains closed until subsequent additional movement of said movable wall and said small closure member causes said connection to engage and open said main closure member to said full flow position.

3. A step-opening fuel valve as defined in claim 2 wherein the means operably connecting said modulating valve to said movable wall is a hollow stem which provides the fuel passage between said inlet and said second chamber.

References Cited by the Examiner
UNITED STATES PATENTS

| | | | |
|---|---|---|---|
| 788,352 | 4/1905 | Crawford | 137/630.15 X |
| 844,946 | 2/1907 | Lowe | 137/505.41 |
| 2,164,511 | 7/1939 | Furlong | 137/505.39 |
| 2,194,749 | 3/1940 | Gregg | 137/510 X |
| 2,635,574 | 4/1953 | Sturtevant | 137/510 X |

ISADOR WEIL, *Primary Examiner.*

WILLIAM F. O'DEA, *Examiner.*

J. O'NEILL, C. GORDON, *Assistant Examiners.*